United States Patent

Nonaka

(10) Patent No.: US 9,500,755 B2
(45) Date of Patent: Nov. 22, 2016

(54) RADIATION IMAGING APPARATUS, DETERMINATION APPARATUS, METHOD OF CONTROLLING RADIATION IMAGING APPARATUS, CALIBRATION METHOD, AND STORAGE MEDIUM

(71) Applicant: CANON KABUSHIKI KAISHA, Tokyo (JP)

(72) Inventor: Hideki Nonaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 14/187,516

(22) Filed: Feb. 24, 2014

(65) Prior Publication Data

US 2014/0252216 A1 Sep. 11, 2014

(30) Foreign Application Priority Data

Mar. 6, 2013 (JP) ................. 2013-044725

(51) Int. Cl.
| | |
|---|---|
| G01T 1/16 | (2006.01) |
| G01T 7/00 | (2006.01) |
| H04N 5/32 | (2006.01) |
| H04N 5/232 | (2006.01) |
| G01T 1/17 | (2006.01) |

(52) U.S. Cl.
CPC ........... *G01T 7/005* (2013.01); *H04N 5/23258* (2013.01); *H04N 5/32* (2013.01); *G01T 1/16* (2013.01); *G01T 1/17* (2013.01)

(58) Field of Classification Search
CPC .................... G01T 1/16; G01T 1/17
See application file for complete search history.

(56) References Cited

U.S. PATENT DOCUMENTS

| 6,092,928 A | * | 7/2000 | Mattson | A61B 6/08 378/197 |
|---|---|---|---|---|
| 7,046,764 B1 | * | 5/2006 | Kump | A61B 6/102 378/117 |
| 7,127,032 B1 | * | 10/2006 | Kump | A61B 6/102 378/117 |
| 2012/0114099 A1 | * | 5/2012 | Yoshida | A61B 6/4233 378/62 |
| 2012/0132821 A1 | | 5/2012 | Kuwabara | 250/370.08 |
| 2012/0138807 A1 | * | 6/2012 | Kondou | G01T 1/247 250/370.08 |
| 2014/0029723 A1 | * | 1/2014 | Somaya | A61B 6/586 378/62 |

FOREIGN PATENT DOCUMENTS

| JP | 2002-543684 | 12/2002 |
|---|---|---|
| JP | 2012-100807 | 5/2012 |
| JP | 2012-110565 | 6/2012 |
| WO | WO 00/65825 A1 | 11/2000 |

\* cited by examiner

*Primary Examiner* — Christine Sung
(74) *Attorney, Agent, or Firm* — Fitzpatrick, Cella, Harper & Scinto

(57) ABSTRACT

A radiation imaging apparatus comprising: a signal generation unit configured to generate a signal value corresponding to charges detected by a radiation detector; an acceleration detection unit configured to detect acceleration applied to the radiation imaging apparatus; a noise measurement unit configured to measure a noise value based on the detected acceleration; a reduction unit configured to reduce the noise value from the signal value; and a radiation irradiation determination unit configured to determine radiation irradiation based on the noise-reduced signal value.

13 Claims, 7 Drawing Sheets

RADIATION IMAGING APPARATUS, DETERMINATION APPARATUS, METHOD OF CONTROLLING RADIATION IMAGING APPARATUS, CALIBRATION METHOD, AND STORAGE MEDIUM

BACKGROUND OF THE INVENTION

Field of the Invention

The present invention relates to a radiation imaging apparatus, a determination apparatus, a method of controlling the radiation imaging apparatus, a calibration method, and a storage medium.

Description of the Related Art

An X-ray imaging system as an example of a radiation imaging system includes an X-ray generator which generates X-rays and an X-ray imaging apparatus which generates an X-ray image upon receiving X-rays. Recently, X-ray imaging apparatuses using FPDs (Flat Panel Detectors) in place of conventional X-ray films or imaging plates have been popular on the market. An FPD has detection elements (pixels) arranged in a matrix pattern on the detector surface, and is configured to accumulate signal charges generated for the respective pixels in accordance with the amount of X-rays detected and generate a signal value of digital data upon A/D conversion after the accumulation. An image obtained by performing image processing to this digital data is used for diagnosis and the like.

An X-ray imaging apparatus using such an FPD is generally used while being fixed to a stand or table. It is, however, sometimes necessary to perform imaging while using an X-ray imaging apparatus in free unfixed positions, depending on the imaging technique to be used. In order to meet such requirements, an apparatus made easy to handle by reducing the thickness and weight of a housing accommodating an FPD has also been commercialized. Such an apparatus can be used while being fixed on a stand or table as in a conventional technique. In addition, the apparatus is used while being placed on a bed or used while being held by a patient as is often practiced in orthopedic surgery. This makes it possible to perform imaging operation which cannot be done in a fixed position. Furthermore, the apparatus can be applied to various usages exploiting portability, for example, bringing out the apparatus from a hospital for use at the time of an accident or disaster and imaging a home health care patient at his/her house.

A conventional X-ray imaging apparatus, however, needs to match the timing of X-ray irradiation with that at which the FPD accumulates signal charges originating from X-rays. This requires an interface or signal cable for electrically connecting synchronization signals between the X-ray generator and the X-ray imaging apparatus.

In order to solve this problem, Japanese Patent Laid-Open No. 2002-543684 has proposed a technique of eliminating the necessity of connection of synchronization signals to an X-ray generator by allowing an X-ray imaging apparatus by itself to detect X-ray irradiation and shift an FPD from a normal mode to a mode of accumulating signal charges originating from X-rays or a subsequent readout mode. This is a scheme of detecting X-ray irradiation by monitoring a bias current in the FPD which varies due to X-ray incidence.

On the other hand, electrical components cannot generally avoid the influence of disturbances, and the X-ray imaging apparatus also generates noise due to a received impact/vibration/acceleration. As a consequence, internal electrical signals are influenced by noise more than a little. A bias current in the FPD is susceptible to the influence of noise because it handles weak signals. Malfunction due to noise leads to false X-ray detection. In practice, therefore, the apparatus executes imaging in spite of no detection of X-rays. In this case, it is necessary to discard images (misshooting) or perform re-imaging operation. This disturbs the work flow of a radiation technician.

In contrast to this, Japanese Patent Laid-Open No. 2012-110565 discloses a technique of setting an FPD in an accumulation state upon determining the start of X-ray irradiation when the electrical signal output from the FPD exceeds a predetermined threshold in a readout state, determining, from the differential value of subsequent FPD outputs, whether the determination of the start of X-ray irradiation is correct, interrupting the accumulation state upon determining that the determination is incorrect, and resuming the determination of the start of X-ray irradiation based on FPD outputs in the readout state.

The technique disclosed in Japanese Patent Laid-Open No. 2012-110565 is configured to perform X-ray irradiation determination by comparing the electrical signal obtained by converting the charges generated in pixels with a threshold. This technique then re-determines, based on a temporal change in the electrical signal after X-ray irradiation determination, whether the electrical signal truly originates from X-ray irradiation or noise, and interrupts accumulation operation which has been started, if determining that the signal originates from noise.

Japanese Patent Laid-Open No. 2012-100807 discloses a similar technique, which is configured to disconnect the operation switching unit of an FPD from an X-ray irradiation detection unit if the detection result obtained by an acceleration sensor which detects acceleration becomes equal to or more than a detection threshold, and invalidate X-ray irradiation detection for a predetermined period.

However, the technique disclosed in Japanese Patent Laid-Open No. 2012-110565 detects false detection by posteriorly re-evaluating the result obtained once by X-ray irradiation determination, interrupts accumulation operation which has been started once, and returns to an X-ray irradiation wait state again. For this reason, it is impossible to perform X-ray irradiation determination at least during return operation. This influences the work flow of a radiation technician more than a little. In addition, upon receiving disturbances almost simultaneously with X-ray irradiation, this technique may determine by re-evaluation that the X-ray irradiation determination result indicates false determination, in spite of actual X-ray irradiation. In this case, the patient is unnecessarily exposed to X-rays.

In addition, according to Japanese Patent Laid-Open No. 2012-100807, it is impossible to perform X-ray irradiation detection for a predetermined period after the detection of acceleration. For this reason, if the apparatus performs X-ray irradiation during this period, an imaging error occurs because the apparatus does not shift to accumulation operation. As a result, the patient may be unnecessarily exposed to X-rays.

In consideration of the above problems, the present invention provides an apparatus which reduces false radiation irradiation detection due to disturbances such as acceleration/impact without disturbing the imaging work flow of a radiation technician, and reduces invalid radiation exposure on a patient in a radiation detector having a radiation detection mechanism which shifts the operation mode of the radiation detector to the accumulation mode by itself upon detecting a radiation irradiation state.

SUMMARY OF THE INVENTION

According to one aspect of the present invention, there is provided a radiation imaging apparatus comprising: a signal generation unit configured to generate a signal value corresponding to charges detected by a radiation detector; an acceleration detection unit configured to detect acceleration applied to the radiation imaging apparatus; a noise measurement unit configured to measure a noise value based on the detected acceleration; a reduction unit configured to reduce the noise value from the signal value; and a radiation irradiation determination unit configured to determine radiation irradiation based on the noise-reduced signal value.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

This embodiment is configured to calculate a noise value superimposed on a signal detecting X-ray irradiation based on an output from an acceleration sensor functioning as an acceleration detection unit, thereby correcting an X-ray irradiation detection signal. Executing X-ray irradiation detection by using a signal with a corrected noise value reduces false X-ray irradiation detection caused by vibration/impact.

In general, an FPD includes a scintillator, a radiation sensor including a photodetector array, and a driving circuit which drives the sensor. In the scintillator, high-energy X-rays excite the matrix material of a phosphor to obtain luminescence in the visible region by recombination energy generated by recombination. The photodetector array is arranged adjacent to the scintillator. The photodetector array converts photons into an electrical signal.

Figure 1:
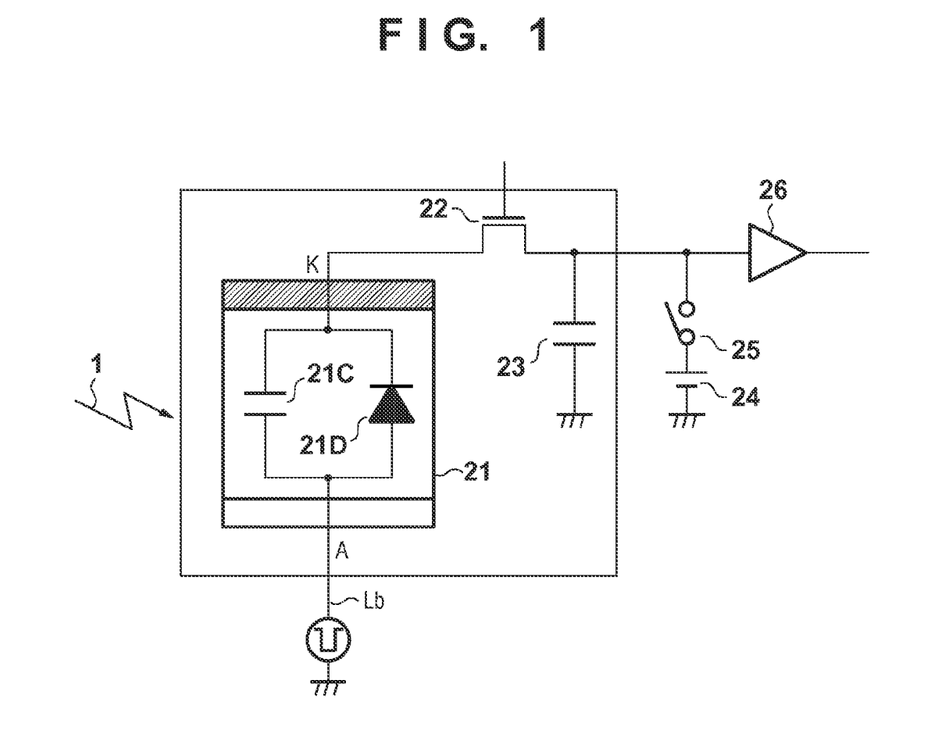
FIG. 1 is an equivalent circuit diagram of a photodetector according to an embodiment of the present invention.

FIG. 1 is an equivalent circuit diagram of a photodetector. Although the following will exemplify an amorphous silicon sensor, the present invention is not limited to this, and other types of image sensors may be used.

One sensor includes a photoelectric conversion element 21 and a switching TFT 22 which controls charge accumulation and readout operation, and is generally formed from amorphous silicon (a-Si) arranged on a glass substrate. A capacitor 21C in the photoelectric conversion element 21 may be a parasitic capacitance of a photodiode 21D or a capacitor intentionally added to improve the dynamic range of the photodetector. An anode A of the photodiode 21D is connected to a bias wiring Lb as a common electrode. A cathode K is connected to the switching TFT 22 for reading out charges accumulated in the capacitor 21C.

Irradiating the photodetector with an X-ray 1, upon resetting the capacitor 21C by operating the switching TFT 22 and a reset switching element 25, causes the photodiode 21D to generate charges in accordance with the dose of X-rays and accumulate charges in the capacitor 21c. Thereafter, operating the switching TFT 22 again will transfer a signal charge to a capacitor 23. A preamplifier 26 then reads out the amount of charges accumulated in the photodiode 21D as a potential signal. The potential signal is A/D-converted and output as an incident X-ray amount.

Figure 2:
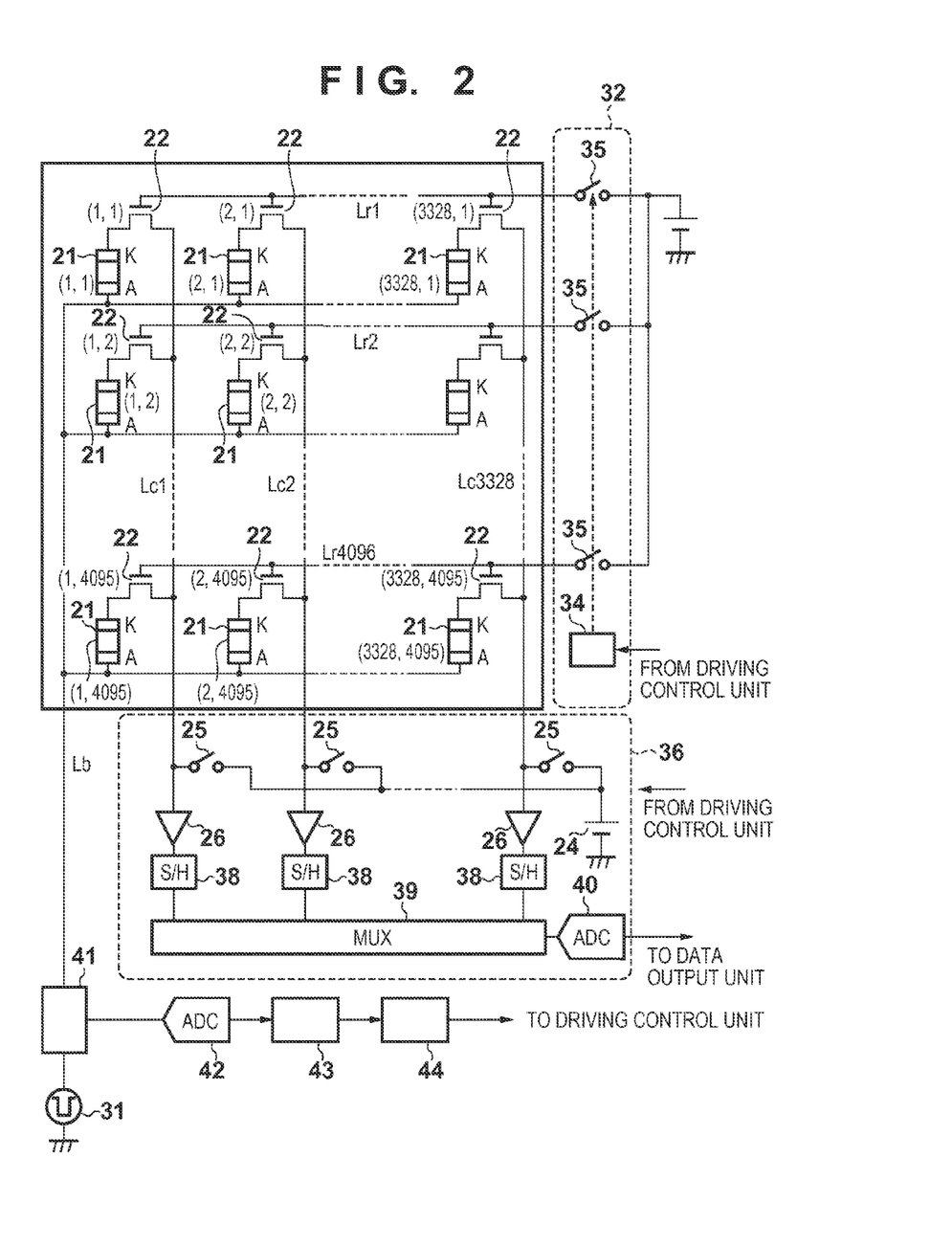
FIG. 2 is an equivalent circuit diagram of a photodetector array according to the embodiment of the present invention.

FIG. 2 is an equivalent circuit diagram of the photodetector array. The photodetector array includes about 2000× 2000 to 4000×4000 pixels and has an area of about 200 mm×200 mm to 500 mm×500 mm. In the case shown in FIG. 2, the photodetector array includes 3328×4096 pixels and has an area of 350 mm×430 mm Each pixel therefore has a size of about 105 μm×105 μm. Each pixel includes the photoelectric conversion element 21 and the switching TFT 22 described with reference to FIG. 1.

The K electrode of a photoelectric conversion element 21($m$, $n$) on each column of the photodetector array is connected to a corresponding one of common column signal lines Lc1 to Lc3328 corresponding to the respective columns via the source/drain conductive path of a corresponding switching TFT 22($m$, $n$). The A electrode of the photoelectric conversion element 21 on each row is connected to a bias power supply 31, which operates operation modes such as an accumulation mode and a readout operation mode, via a common bias wiring Lb.

The gate electrodes of the switching TFTs 22 on respective rows are connected to row selection wirings Lr1 to Lr4096. Each row selection wiring Lr is connected to a driving control unit (not shown) via a line selection unit 32. The line selection unit 32 includes, for example, an address decoder 34 and 4,096 switch elements 35. This arrangement enables readout from an arbitrary line Lrn (n is a natural number).

On the other hand, each column signal wiring Lc is connected to a signal readout unit 36 controlled by the driving control unit (not shown). As described above with reference to FIG. 1, the reset switching element 25 is a switch for resetting the column signal wiring Lc to the potential of a reset reference power supply 24. The preamplifier 26 is an amplifier for amplifying a signal potential. Reference numeral 38 denotes a sample/hold circuit; 39, an analog multiplexer; and 40, an A/D converter functioning as a signal generation unit. The preamplifier 26 amplifies a signal from each column signal wiring Lcn (n is a natural number). The sample/hold circuit 38 holds the amplified signal. The analog multiplexer 39 sequentially outputs the outputs from the sample/hold circuit 38 to the A/D converter 40, which converts the outputs into digital values and outputs them.

In this embodiment, the 3328×4096 pixels are grouped into 3,328 lines to simultaneously transfer outputs from 3,328 pixels per column. The analog multiplexer 39 sequentially outputs the outputs to the A/D converter 40 via the column signal wiring Lc, preamplifiers 26-1 to 26-3328, and sample/hold circuits 38-1 to 38-3328. Note that FIG. 2 shows as if the apparatus includes one A/D converter 40. In practice, however, the apparatus simultaneously performs A/D conversion via a plurality of systems to shorten the readout time for image signals while keeping the analog signal band and A/D conversion rate low.

All the switching TFTs 22 are set in the OFF state during accumulation operation. In this state, signal charges are accumulated in the photoelectric conversion elements 21. When performing readout operation for accumulated signal charges, the address decoder 34 sequentially turns on the switch elements 35 to drive the switching TFTs 22 connected to the row selection wirings Lr1 to Lr4095 row by row. The signal charges accumulated in the capacitors 21C are read out to the column signal lines Lc1 to Lc3328 when the switching TFTs 22 are turned on.

The photoelectric conversion element 21 generates dark charges even in a period during which no X-ray irradiation is performed. The dark charges are accumulated in the capacitor 21C as in the case during accumulation operation. These accumulated charges are noise components (dark noise) which cannot be formed into an X-ray image, and are accumulated in the capacitor 21C with the lapse of time, resulting in influences such as a reduction in dynamic range at the time of X-ray imaging. It is therefore necessary to periodically perform idle readout operation to remove dark charges. Since the apparatus performs idle readout operation by reading out charges accumulated in the capacitors 21C in the same manner as in the case of normal readout operation, the photodetector array operates in the same manner as in the case of readout operation. That is, the address decoder 34 sequentially turns on the switch elements 35 to drive the switching TFTs 22 row by row, thereby reading out charges accumulated in the capacitors 21C to the column signal lines Lc1 to Lc3328. Since idle readout operation is performed to sweep noise components, the readout charges are unnecessary as data. Hence, unlike normal readout operation, it is not necessary to operate the sample/hold circuit 38, the analog multiplexer 39, and the A/D converter 40 after the preamplifier 26. The operation time in normal readout operation is constrained by the ON time of the switching TFT 22 which influences the transfer efficiency from the capacitor 21C, the sample/hold time, the response time of the multiplexer, the operating frequency of the A/D converter, and the like. In contrast to this, since there are no constraint factors other than the ON time of the switching TFT 22 in idle readout operation, the readout time can be shorter than that in normal readout operation within the range in which a sufficient dark charge sweeping efficiency can be ensured.

Although the charges generated in the photodiode 21D upon X-ray irradiation are accumulated in the capacitor 21C, the charges partially leak to the bias wiring Lb to generate current fluctuations corresponding to the irradiation amount of X-rays in the bias wiring Lb. Observing this bias current can help grasp an X-ray irradiation state. That is, in this embodiment, the photoelectric conversion elements 21 and the photodetector array as an aggregate of the photoelectric conversion elements also function as radiation irradiation detection elements. However, the present invention is not limited to this, and the apparatus may be provided with radiation irradiation detection elements independently of the photodetector array. A bias current measurement unit 41 in FIG. 2 observes such current fluctuations and converts them into voltage values. An A/D converter 42 converts the voltage values into digital values.

Figure 3:
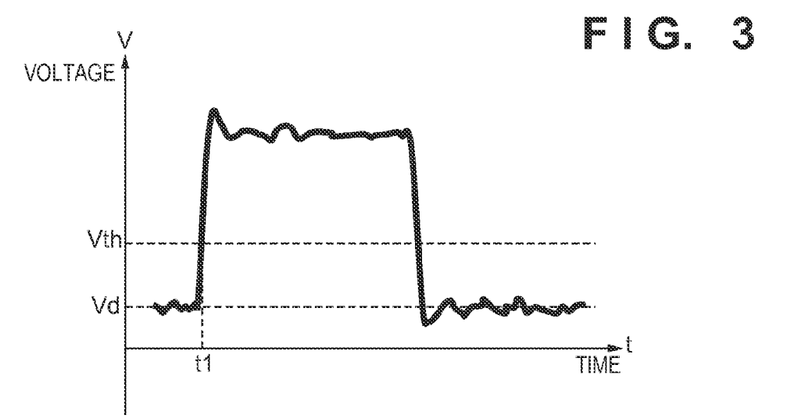
FIG. 3 is a graph showing an example of converting a bias current into a voltage value according to the embodiment of the present invention.

FIG. 3 shows an example of converting a bias current into a voltage value. A voltage Vd originating from the leakage of a dark current generated in the photoelectric conversion element 21 is observed even in a state in which no X-ray irradiation is performed. When X-ray irradiation starts at time t1, the photoelectric conversion element 21 generates charges corresponding to the amount of X-rays entering the photoelectric conversion element 21, and a bias current increases accordingly. FIG. 3 shows a voltage value V measured by the bias current measurement unit 41 as a result of the above operation. Since the voltage value V becomes a voltage corresponding to the irradiation amount of X-rays, it is possible to determine that X-ray irradiation has started at the time when the voltage value has exceeded a threshold Vth set in advance for voltage values. Upon determining that X-ray irradiation has started, the apparatus shifts the operation mode of the photodetector array to the accumulation mode and then shifts the operation mode of the photodetector array to the readout mode after accumulation up to the end of X-ray irradiation, thereby acquiring X-ray image data. According to this scheme, it is possible to acquire an X-ray image by controlling the operation of the FPD in synchronism with X-ray irradiation without providing any interface with the X-ray generator.

Figure 4:
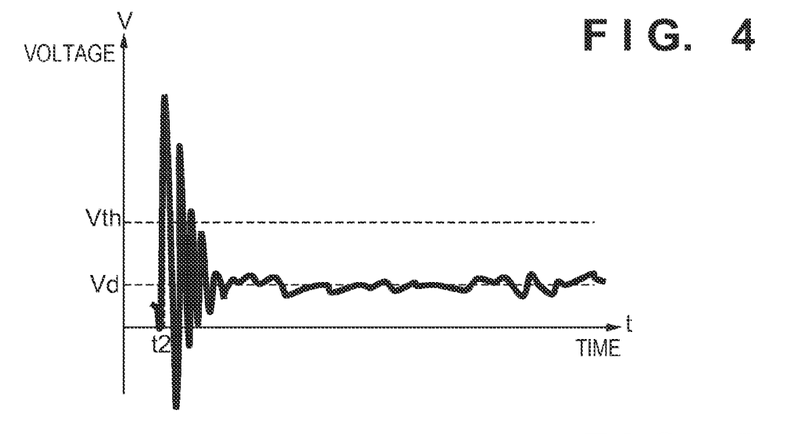
FIG. 4 is a graph showing a voltage value in a bias current measurement unit 41 on which noise is superimposed when an impact is applied to an FPD according to the embodiment of the present invention.

When vibration/impact is externally applied to the FPD, the capacitances of the photodetector array itself and peripheral circuits finely change. As a result, noise is superimposed on the leak current detection result. FIG. 4 shows the voltage value V in the bias current measurement unit 41 on which noise is superimposed when an impact is applied to the FPD in a non-X-ray irradiation state. The waveform of noise is a damped vibration waveform having an amplitude corresponding to impact strength and a frequency mainly originating from the natural frequency of the FPD itself. A noise voltage generated by an impact/vibration is about 0.1 to 100 times an output voltage originating from X-ray detection in some case, which is too large to be ignored, although it depends on the magnitude of the impact/vibration. Although no X-ray irradiation is performed in the case shown in FIG. 4, a noise voltage Vn originating from an impact exceeds an X-ray detection threshold voltage Vth. For this reason, the apparatus erroneously determines that X-ray irradiation has started at time t2.

Figure 5:
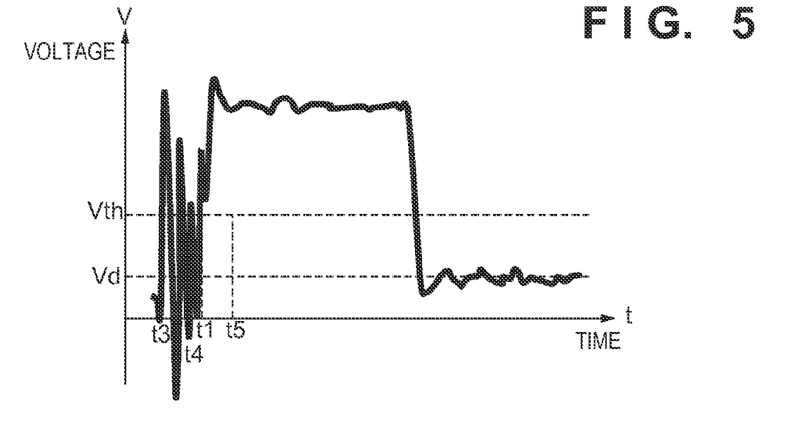
FIG. 5 is a graph showing a voltage value in the bias current measurement unit 41 upon X-ray irradiation immediately after the application of an impact to the FPD according to the embodiment of the present invention.

Depending on the imaging technique to be used, a radiation technician or patient holds the FPD. In such a case, an impact is accidentally applied to the FPD more than a little by, for example, striking the FPD against an imaging table. FIG. 5 shows the voltage value V in the bias current measurement unit 41 upon X-ray irradiation immediately after the application of an impact. There is observed the voltage waveform obtained when noise originating from an impact is superimposed on a current fluctuation due to X-ray irradiation. For example, the technique disclosed in Japanese Patent Laid-Open No. 2012-110565 determines false detection at time t4 from the vibration state of a voltage waveform after the apparatus shifts to accumulation operation upon determining the start of X-ray irradiation at time t3, interrupts the accumulation operation, and returns to X-ray irradiation detection operation again. If it requires the time from t4 to t5 to perform this returning operation, the apparatus detects the start of X-ray irradiation after t5. Assume that X-ray irradiation has started at time t1 in the interval from t4 to t5. In this case, since the apparatus detects X-ray irradiation with a delay, charges generated by X-ray irradiation in this interval, that is, data forming an X-ray image, are lost accordingly. This means that the patient was unnecessarily exposed to X-rays. In some case, if the apparatus performs imaging by X-ray irradiation in a very short time, X-ray irradiation is complete in the interval between t4 and t5, and the X-ray detection function does not work. As a result, the apparatus may not shift to accumulation operation and subsequent readout operation, and hence may obtain no X-ray image.

Figure 6:
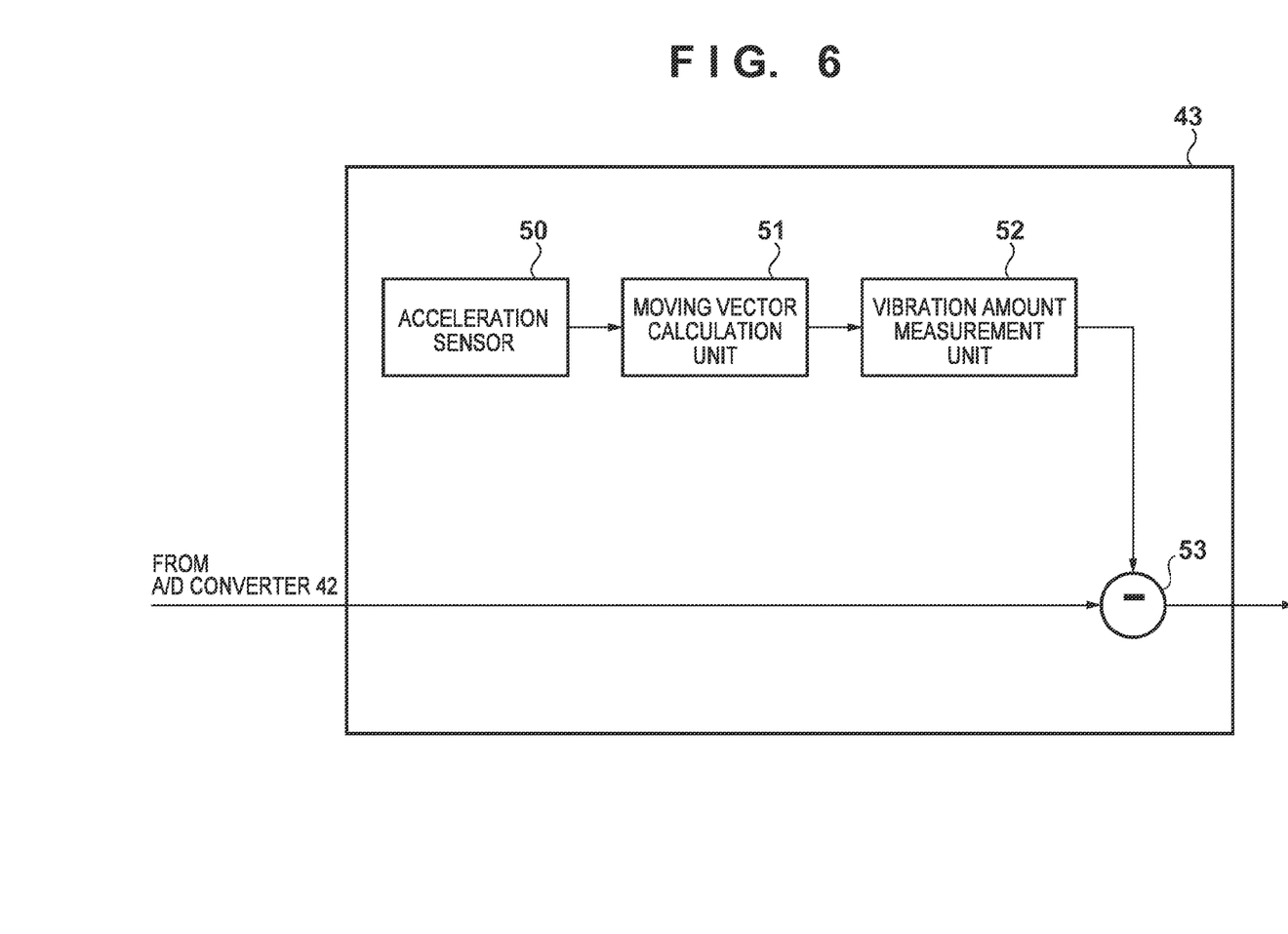
FIG. 6 is a view showing an example of the internal arrangement of a vibration detection unit 43 according to the embodiment of the present invention.
Figure 7:
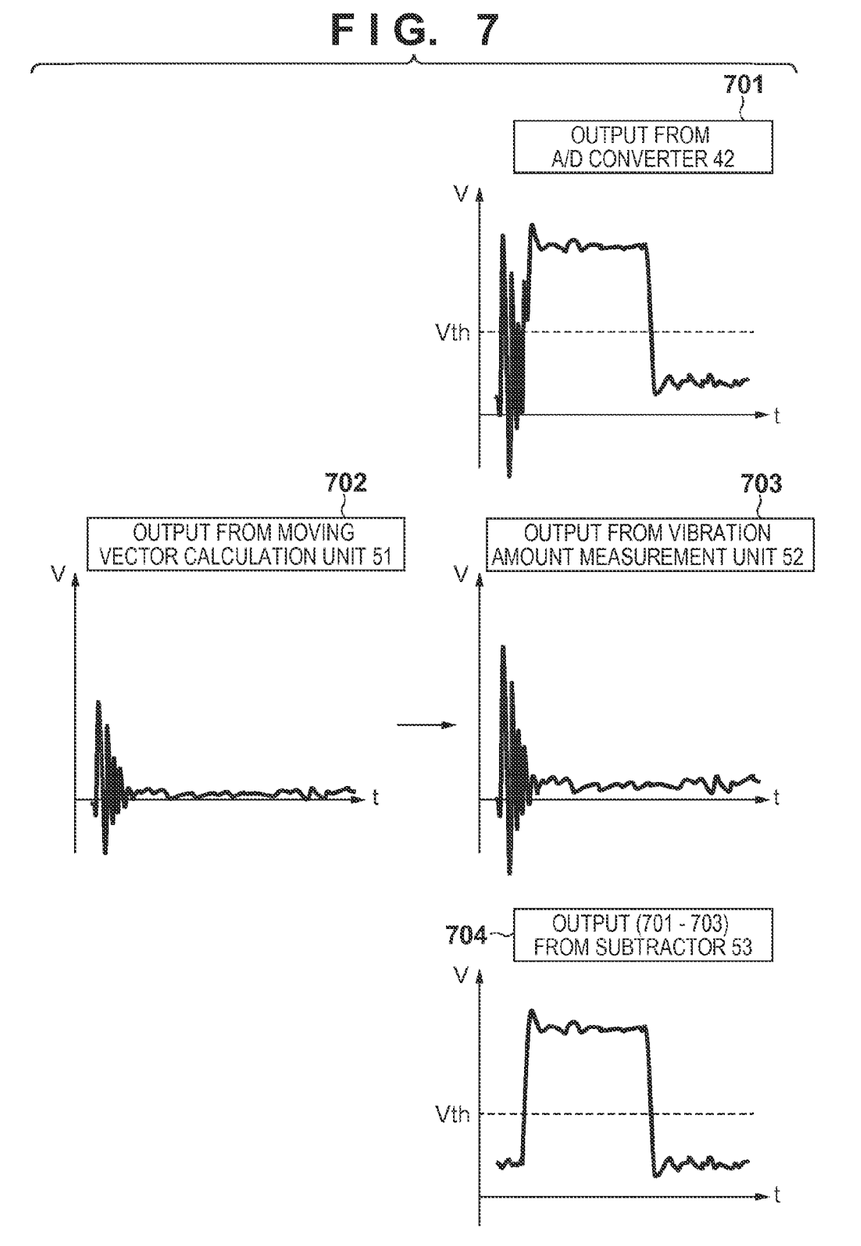
FIG. 7 is a view showing the respective signals used for vibration noise correction and a correction result from an A/D converter 42 according to the embodiment of the present invention.

These false operations have occurred because the noise voltage Vn due to vibration (acceleration) has exceeded the X-ray detection threshold voltage Vth. Canceling the noise voltage can therefore avoid false operation. As shown in FIG. 2, this embodiment is provided with a vibration detection unit 43 in front of an X-ray irradiation detection unit 44. The vibration detection unit 43 includes an acceleration sensor 50 (acceleration detection unit) for detecting an impact/vibration (acceleration), as shown in FIG. 6. The acceleration sensor 50 detects accelerations in the X-axis and Y-axis directions parallel to an imaging plane of the photodetector array and the Z-axis direction perpendicular to them. A motion vector calculation unit 51 calculates an instantaneous value (motion vector value) of a motion vector of the FPD main body from 3-axis acceleration data obtained by the acceleration sensor 50. The magnitude of the calculated motion vector indicates the magnitude of vibration originating from an impact applied to the FPD, and hence has a correlation with the vibration noise voltage Vn shown in FIG. 4, which is generated by the vibration originating from the same impact. If this correlation is known, it is possible to estimate the vibration noise voltage Vn from the magnitude of a motion vector. Assume that it is known that the vibration noise voltage Vn exhibits linearity expressed by Vn=KJ+D (K and D are constants) with respect to a magnitude J of the motion vector calculated by an output from the acceleration sensor 50. In this case, as shown in FIG. 7, a vibration amount measurement unit 52 executes linear computation for the calculated vector value. It is possible to correct the vibration noise value by subtracting the computation result from an output from the A/D converter 42. That is, the apparatus converts an output value 702 from the motion vector calculation unit 51 into an output value 703 of the vibration amount measurement unit 52 based on the correlation. A subtractor 53 (reduction unit) subtracts (reduces) the output value 703 from an output value 701 from the A/D converter 42. This makes it possible to acquire an output value 704 from the subtractor 53 from which the influence of the impact/vibration is removed. Using the output value 704 can reduce false radiation irradiation detection caused by disturbances such as vibration/impact.

Figure 9:
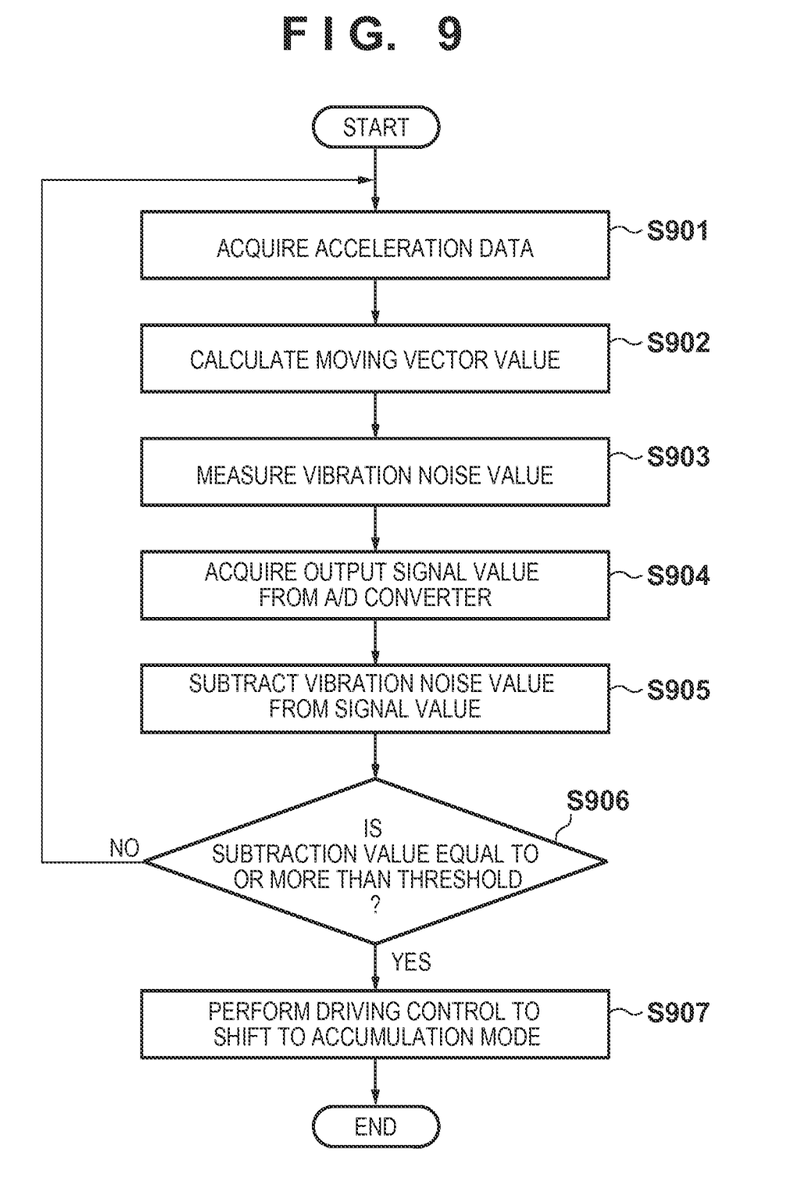
FIG. 9 is a flowchart showing a procedure for processing executed by a radiation imaging apparatus according to the embodiment of the present invention.

A procedure for processing executed by the radiation imaging apparatus according to this embodiment will be described below with reference to the flowchart of FIG. 9.

In step S901, the acceleration sensor 50 detects acceleration data in the X-axis and Y-axis directions parallel to an imaging plane of the photodetector array and the Z-axis direction perpendicular to them to detect an impact/vibration. In step S902, the motion vector calculation unit 51 acquires the 3-axis acceleration data from the acceleration sensor 50 and calculates an instantaneous value (motion vector value) of a motion vector of the FPD main body based on the acceleration data.

In step S903, the vibration amount measurement unit 52 calculates a vibration noise value based on the motion vector value calculated by the motion vector calculation unit 51. In step S904, the vibration detection unit 43 acquires the signal value output from the A/D converter 42.

In step S905, the subtractor 53 performs correction by subtracting the vibration noise value acquired from the vibration amount measurement unit 52 from the output value from the A/D converter 42.

In step S906, the X-ray irradiation detection unit 44 functioning as a radiation irradiation determination unit determines, based on the output value corrected by the subtractor 53, whether the output value is equal to or more than a threshold. If the X-ray irradiation detection unit 44 determines that the output value is equal to or more than the threshold (YES in step S906), the process advances to step S907. If the X-ray irradiation detection unit 44 determines that the output value is less than the threshold (NO in step S906), the process returns to step S901.

In step S907, the driving control unit (not shown) determines that X-ray irradiation has started at the time when the output value has exceeded the threshold, that is, determines that the radiation detector is irradiated with X-rays, and sets the operation mode of the FPD to accumulation mode to start charge accumulation. With the above operation, the apparatus terminates each process in the flowchart of FIG. 9.

With this arrangement, letting the radiation detection apparatus shift from the operation mode to the accumulation mode by itself upon detecting a radiation irradiation state can reduce false radiation irradiation detection caused by disturbances such as vibration/impact.

Figure 8:
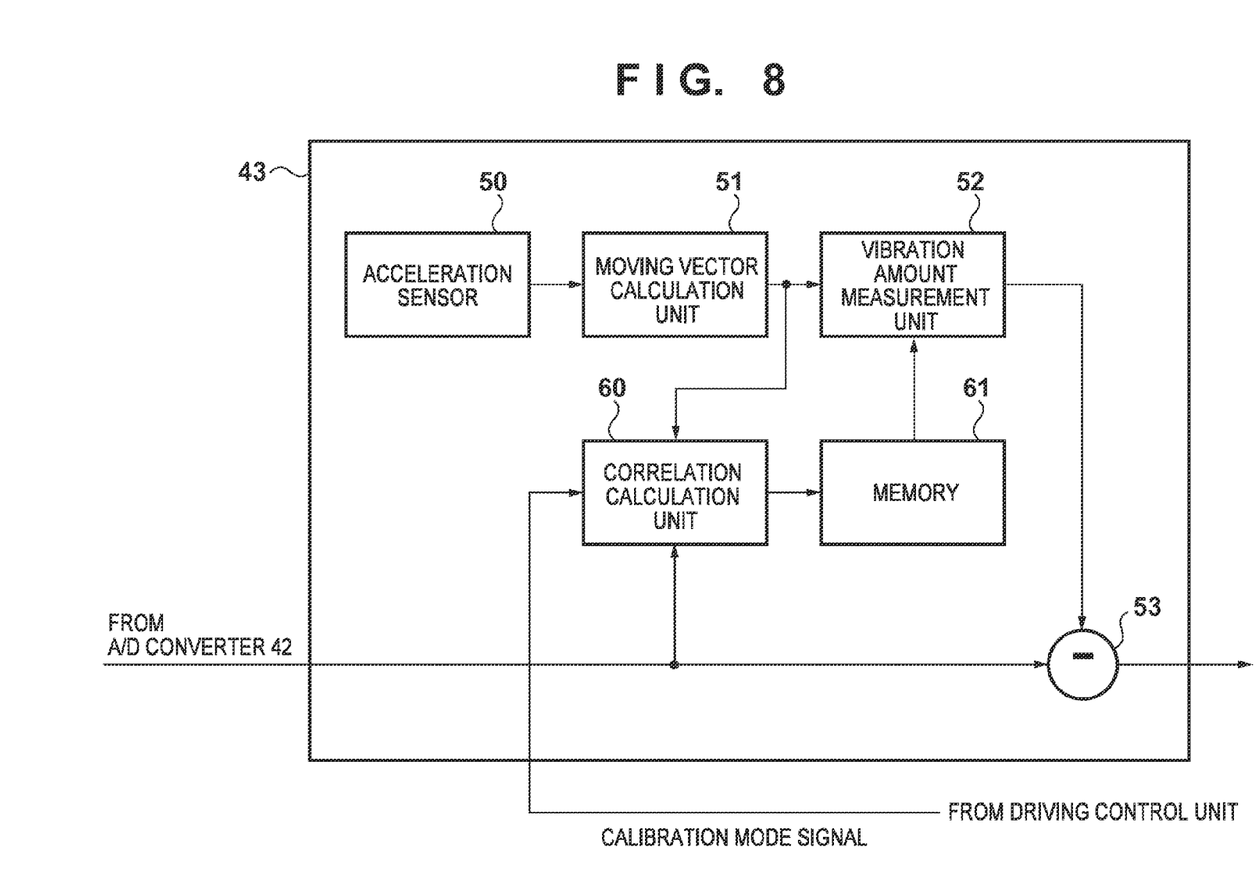
FIG. 8 is a block diagram showing another example of the internal arrangement of the vibration detection unit 43 according to the embodiment of the present invention.

Note that in an actual apparatus, the constants K and D are not sometimes uniquely determined in linear computation due to variations in work/assembly accuracy and component accuracy. In order to correct such individual apparatus differences, the vibration detection unit 43 may be configured as shown in FIG. 8. Referring to FIG. 8, the motion vector calculation unit 51 calculates the magnitude of a motion vector based on an output from the acceleration sensor 50. The calculated magnitude of the motion vector is input to the vibration amount measurement unit 52 and a correlation calculation unit 60. An output from the A/D converter 42 is input to the correlation calculation unit 60 in the same manner as described above. The driving control unit (not shown) transmits a calibration mode signal to the correlation calculation unit 60. The correlation calculation unit 60 operates only when the calibration mode signal is ON.

Calibration operation of setting the constants K and D for each individual apparatus will be described below. In calibration operation, the driving control unit (not shown) turns on a calibration mode signal. In this state, when an impact/vibration is applied to the FPD main body without performing X-ray irradiation, the motion vector amount calculated by the motion vector calculation unit 51 based on an output from the acceleration sensor 50 is input to the correlation calculation unit 60. In the same way, an output signal value from the A/D converter 42, that is, a vibration noise voltage at the time of the application of the impact, is input to the correlation calculation unit 60. The constants K and D (correlation information) are decided based on these two inputs. The constants K and D may be derived by applying an impact/vibration in the calibration operation a plurality of times while changing the magnitude of the impact/vibration and applying processing such as averaging the results. The derived constants K and D are stored in a memory 61 which is referred to by the vibration amount measurement unit 52.

In normal operation in which a calibration signal is OFF, the vibration amount measurement unit 52 can correct a vibration noise value by deciding a corrected value of the vibration noise voltage Vn by using the constants K and D stored in the memory 61 and subtracting the resultant value from an output from the A/D converter 42.

For the sake of simplicity, a linear correlation has been exemplified. However, the present invention is not limited to this, and a nonlinear correlation may be used. Likewise, the computation executed by the vibration amount measurement unit 52 is not limited to a linear equation and may accompany a multidimensional polynomial, differential and integral calculus, vector computation, and the like.

As has been described above, according to this embodiment, it is possible to reduce false radiation irradiation detection caused by disturbances such as vibration/impact by canceling a vibration noise value superimposed on a signal for determining a radiation irradiation state with the corrected value calculated from an output from the acceleration sensor or the like.

According to the present invention, it is possible to reduce false radiation irradiation detection caused by disturbances such as vibration/impact, avoid disturbance on an imaging work flow of a radiation technician, and reduce invalid radiation exposure on a patient.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-044725 filed on Mar. 6, 2013, which is hereby incorporated by reference herein in its entirety.

What is claimed is:

1. A radiation imaging apparatus comprising:
    a signal generation unit configured to generate a signal value corresponding to charges detected by a radiation detector;
    an acceleration detection unit configured to detect acceleration applied to the radiation imaging apparatus;
    a noise measurement unit configured to measure a noise value based on the detected acceleration;
    a reduction unit configured to reduce the noise value from the signal value;
    a radiation irradiation determination unit configured to determine radiation irradiation based on the noise-reduced signal value; and
    a driving control unit configured to perform control to shift an operation mode of the radiation imaging apparatus to an accumulation mode for accumulating charges if said radiation irradiation determination unit determines that radiation irradiation is performed.

2. The apparatus according to claim 1, wherein said radiation irradiation determination unit determines that radiation irradiation is performed, if an output value from said reduction unit is not less than a threshold.

3. The apparatus according to claim 1, further comprising a motion vector calculation unit configured to calculate a motion vector value from the acceleration, wherein said noise measurement unit measures, based on correlation information between a predetermined motion vector value and a noise value, the noise value from the motion vector value.

4. The apparatus according to claim 3, further comprising:
    a correlation calculation unit configured to calculate the correlation information from a signal value generated by said signal generation unit and a motion vector value based on acceleration detected by said acceleration detection unit, when acceleration is applied to the radiation imaging apparatus while no radiation irradiation is performed; and
    a storage unit configured to store the correlation information calculated by said correlation calculation unit.

5. The apparatus according to claim 1, wherein said signal generation unit generates a signal value from said radiation detector during periodic idle operation.

6. The apparatus according to claim 1, wherein said radiation detector includes a photodetection array having a plurality of photoelectric conversion elements and a bias line which supplies a voltage from a bias power supply to said plurality of photoelectric conversion elements, and
    said signal generation unit generates a signal value corresponding to a current flowing in the bias line during periodic idle operation.

7. The apparatus according to claim 1, wherein said radiation detector includes a photodetection array having a plurality of photoelectric conversion elements, a bias line which supplies a voltage from a bias power supply to each of said plurality of photoelectric conversion elements, a switching element connected to each of the plurality of photoelectric conversion elements, and a column signal line connected to the plurality of photoelectric conversion elements via the switching elements, and
    said signal generation unit generates a signal value corresponding to a current flowing in the bias line during periodic idle operation, and
    wherein the apparatus further comprises:
    a driving circuit configured to turn off the switching element based on the signal value; and
    a readout circuit configured to obtain radiation image data based on an image signal obtained via the column signal line.

8. The apparatus according to claim 1, further comprising a memory configured to store information indicating a relationship between the plurality of different values of acceleration and the measured noise amounts, wherein said noise measurement unit measures a noise value based on the detected acceleration and the information indicating the relationship.

9. The apparatus according to claim 1, wherein said noise measurement unit measures, in accordance with application of a plurality of different values of acceleration to said radiation detector, noise amounts respectively corresponding to the plurality of different values of acceleration, and the apparatus further comprising:
an acquisition unit configured to acquire information indicating a relationship between the plurality of different values of acceleration and the measured noise amounts; and
a memory configured to store the acquired information indicating the relationship.

10. The apparatus according to claim 9, further comprising an output unit configured to output a signal for instructing execution of calibration, wherein said acquisition unit acquires information indicating a relationship between the plurality of different values of acceleration and the measured noise amounts in accordance with reception of the signal.

11. A method of controlling a radiation imaging apparatus, the method comprising steps of:
generating a signal value corresponding to charges detected by a radiation irradiation detection element;
detecting acceleration applied to the radiation imaging apparatus;
measuring a noise value based on the detected acceleration;
reducing the noise value from the signal value;
determining radiation irradiation based on an output in said reducing step; and
performing control to shift an operation mode of the radiation imaging apparatus to an accumulation mode for accumulating charges if it is determined that radiation irradiation is performed.

12. A non-transitory computer-readable storage medium storing a computer program for causing a computer to execute each step in a method of controlling a radiation imaging apparatus, the method comprising steps of:
generating a signal value corresponding to charges detected by a radiation irradiation detection element;
detecting acceleration applied to the radiation imaging apparatus;
measuring a noise value based on the detected acceleration;
reducing the noise value from the signal value;
determining radiation irradiation based on an output in said reducing step; and
performing control to shift an operation mode of the radiation imaging apparatus to an accumulation mode for accumulating charges if it is determined that radiation irradiation is performed.

13. A radiation imaging apparatus comprising:
a signal generation unit configured to generate a signal value corresponding to charges detected by a radiation detector;
a vibration noise amount obtaining unit configured to obtain a vibration noise value that is on the basis of a vibration applied to the radiation imaging apparatus;
a correction unit configured to correct the signal value using the vibration noise value;
a radiation irradiation determination unit configured to determine radiation irradiation based on the signal value corrected by the correction unit; and
a driving control unit configured to perform control to shift an operation mode of the radiation imaging apparatus to an accumulation mode for accumulating charges if said radiation irradiation determination unit determines that radiation irradiation is performed.

* * * * *